Patented May 16, 1933

1,909,860

UNITED STATES PATENT OFFICE

RODNEY B. HARVEY, OF ST. PAUL, MINNESOTA, ASSIGNOR TO FOOD MACHINERY CORPORATION, OF SAN JOSE, CALIFORNIA, A CORPORATION OF DELAWARE

PROCESS OF TREATING FRUIT

No Drawing.    Application filed February 24, 1933. Serial No. 659,167.

This invention relates to a process of treating fruit, whereby a desired color may be imparted to the fruit. The invention is particularly directed to the treatment of citrus fruit, such as oranges, and provides a method and means for enhancing the varietal color thereof.

For a great many years it has been known that the color of fruit of a particular variety is greatly influenced by the environment in which it is raised, that is, the color of the fruit will vary with the character of the soil, intensiveness of cultivation and fertilization, the kind of soil food used during fertilization, and purely climatic conditions such as the intensity of the sunlight during various stages of the fruit's growth, the presence of rain during other portions of the fruit's growth, etc. The location of the fruit on the tree will very often influence the development of color in such fruit and it has been appreciated for a long time that fruit which is off color may be just as satisfactory from the standpoint of flavor, juice content, solids content and sugar content, as another fruit of the same variety but of a more fully developed color. The fact remains, however, that the growers have not been able to obtain as great a remuneration for off-color fruit as for fruit in which the color has been more definitely and attractively developed, this condition being due to the sales appeal or attractivenes of the more vividly colored fruit.

One of the objects of this invention is to disclose and provide a method whereby fruit of characteristics or properties meeting predetermined standards may have a desired or predetermined color imparted thereto. If, for example, the fruit in a specified batch differs in color but has a desired and satisfactory content of juice in which a desired or predetermined sugar content has developed, then all of such fruit may be treated in accordance with this invention and a distinguishing or characteristic color may be imparted to the fruit. The color may be a varietal color, characterizing the particular variety of fruit being treated, thereby rendering the entire batch of fruit salable on the basis of actual worth.

Heretofore the only method available for influencing the color of fruit has been the treatment of fruit with hydrocarbon gases such as ethylene gas, whereby the green chlorophyll may be bleached out. This method does not, however, impart to the fruit a desired coloration nor does it enhance the varietal color of the fruit.

It has been discovered that a desired color may be imparted to citrus fruit, particularly oranges, tangerines and the like, by using as a treating agent a solvent capable of affecting the oily and wax-containing skin or peel of the fruit, such solvent carrying a suitable coloring material. It has been discovered that when fruit are treated in accordance with this invention, the fruit attain a substantially uniform desired coloration without losing their characteristic surface texture or appearance. By employing a suitable non-aqueous solvent and a coloring agent of a color or shade complementary to that of the fruit being treated, a characteristic or varietal color may be imparted to fruit which are of satisfactory juice and solids content, acid content, flavor, etc., but which are of an unfortunate, off-color.

An object of this invention, therefore, is to disclose and provide a process of treating fruit whereby fruit which are satisfactory from the standpoint of flavor, juice content, size, or other characteristic, but which are off-color, may have a desired varietal color imparted thereto.

Another object is to disclose and provide a method of enhancing the color of citrus fruit.

A further object of the invention is to disclose and provide means and conditions whereby a distinctive coloring may be imparted to fruit without impairing the characteristic texture or appearance of the fruit.

A still further object of this invention is to disclose and provide means and methods of impregnating the skin or peel of fruit with a dye or coloring material, whereby a desired coloration is imparted to the fruit.

These and other objects, uses and advantages will become apparent to those skilled in the art from the following detailed description of a preferred mode of operation and of certain variations thereof. In order to facilitate understanding, particular reference will be made to the adaptation of the invention to the treatment of citrus fruit such as oranges.

As has been stated hereinbefore, oranges may be "chemically mature", i. e., contain a predetermined and desired high ratio of sugars and soluble solids to acid, and have a required juice and pulp ratio, but because of cultivation, weather conditions, etc., the fruit may be of a yellow or very pale orange color instead of the vivid, characteristic orange color of fruit raised under ideal conditions. Such off-color fruit may then be treated in accordance with this invention to cause the fruit to assume a desired varietal coloration, thereby increasing the value of the crop.

Generally stated, the process comprises incorporating a suitable coloring material in a non-aqueous liquid or solvent capable of impregnating or affecting the oily or waxy peel of the fruit, and then applying the prepared color-imparting reagent to the fruit in any suitable manner, as by dipping or immersing the fruit therein, or by spraying the fruit therewith. The color-imparting agent may be used alone or in combination with other materials, either in solution or in emulsion therewith, as will become apparent from more detailed examples given hereinafter.

The color-imparting agent, therefore, consists essentially of a non-aqueous liquid or solvent and a suitable coloring material and by the term "solvent" as used hereinafter, reference will be had to the liquid carrier whereby the coloring material is caused to become a part of the skin or peel of the fruit.

It has been found that the solvent is preferably an organic non-aqueous liquid capable of wetting the oily or waxy peel of the fruit. Furthermore, the solvent is preferably of such character that under the conditions of application it will not injure or burn the fruit. Moreover, it should be capable of carrying the coloring material into the peel of the fruit.

Various solvents having the characteristics above defined are available for the purposes of this invention. Mineral oils and distillates, vegetable oils and organic solvents such as alcohols, ketones, and the like, may be used. Any liquid capable of exerting a solvent action upon the oily or waxy constituents of the peel of the fruit may be used, it being understood that such solvent action may vary within wide limits. For example, highly refined mineral oils of the white medicinal oil type, Red engine oil, and mineral oils of the lubricating oil range appear to be absorbed by the skin or peel of the fruit, but slowly, whereas petroleum distillates such as kerosene extract, ethyl chloride, methyl ethyl ketone, alcohol and chloroform have the ability of impregnating and permeating the outer portion of the peel very quickly.

Solvents of the character above stated are used in applying a suitable coloring material to the fruit. Oil-soluble organic dyes such as the aniline dyes, have been found to be more satisfactory than the vegetable dyes because they are less subject to fading upon exposure to light.

In the treatment of oranges, Yellow O B, Yellow A B and alkanet red have been used. Any dye or coloring material capable of going into solution or being carried by the solvent or vehicle may be used. The three dyes are hereinabove mentioned specifically merely because they are approved food product dyes. It is to be remembered that the solubility of the dyes in solvents of different types may vary appreciably and this point should be taken into consideration in selecting the solvent and the dye. Although various vegetable oils such as palm oil, cottonsed oil, etc., may be used, the other solvents mentioned hereinabove are preferred because of the apparently greater solubility of the dyes therein.

The amount of coloring material added to the solvent will vary with the intensity or tinctorial power of the coloring material and the results desired. The solution of organic dyes in the heavier oleaginous liquids may be facilitated by gently heating the mixture of dye and liquid. From 1% to more than 50% by weight of dye may be carried by the solvent.

In its simplest embodiment, the oleaginous or non-aqueous liquid or solvent carrying the desired coloring material is applied to the fruit in any suitable manner, as by dipping or immersing the fruit therein or by spraying the fruit therewith. This color-imparting agent may be applied to atmospheric temperatures or at temperatures up to about 120–125° F. Excess color-imparting agent is preferably removed from the fruit by washing or spraying with water and the fruit is then dried, sorted and polished. When solvents having high penetrative powers are employed, the desired coloration will be apparent on the fruit almost immediately after the application of the color-imparting agent thereto. It has been found that although the desired color is not necessarily evidenced immediately after such application of color-imparting agent, the desired color develops and becomes apparent with passage of time after such treatment, this time factor being particularly noticeable when the solvent or carrier does not have an energetic solvent action upon the oils and waxes in the peel of the fruit. For example, if the coloring material is carried by a mineral oil of the lubricating oil range, a pronounced change in color may be evidenced only after the expiration of 1 to 2 hours, optimum color developing subsequently upon the expiration of from 3 to 24 hours.

The development of color is expedited by applying the color-imparting agent in a warm condition, a longer period of time being necessary when the application is made at atmospheric temperatures. When the lighter and more penetrating solvents are used, the difference in the development of color does not appear to be influenced by the temperature of the color-imparting agent.

The uniform distribution of the color-imparting agent to the surface of the fruit may be facilitated by emulsifying the color-imparting agent in water or an aqueous solution, and by the use of spreaders or materials adapted to lower the surface tension of the color-imparting agent, thereby assisting in the distribution of the color-imparting agent over the surface of the fruit. These spreaders may be soluble either in the color-imparting agent or in the aqueous or other phase of the emulsion. When a color-imparting agent of the character described in the preceding paragraphs is emulsified in water, substances such as soaps preferably sodium or potassium soaps), triethanolamine, borax, sodium carbonate, trisodium phosphate, etc., may be used as spreading agents and as stabilizing and emulsifying agents. Stearic or oleic acid and an inorganic base such as alkaline solution or similar acids, in combination with an organic base such as triethanolamine, may be used.

Such emulsions may be prepared directly for use but preferably a stock emulsion is first made in concentrated form and then diluted with water. A suitable stock emulsion may contain from 50 to 250 parts of the color-imparting agents (solvent and coloring substances) and 25 to 250 parts of emulsifying agent and spreader such as soap, to 1000 parts of water by weight. Such stock emulsion in semi-liquid or paste form can then be diluted in the proportion of from about 1:50 to 1:200 with water or aqueous solution in the washing or treating tank. In other words, the final emulsion for imparting a desired color to fruit may contain from 0.5% to about 9.5% of solvent which carries a coloring substance and constitutes from about 0.01% to 1.0% by weight of the total and from about 90% to 99% of water, depending upon the quantity and character of the spreaders, emulsifying agents, and other materials present.

The color-imparting agent, in the form of an emulsion of the type described, may be applied to the fruit which it is desired to color, in any suitable manner, either at atmospheric temperatures or at temperatures up to about 120° F.

As has been stated hereinbefore, the enhancement of the color of the fruit may be apparent immediately upon treatment, or the color will develop with passage of time, this depending upon the character of the solvent employed in the color-imparting agent.

It is to be understood that the color imparted to fruit does not impair, mask or destroy the natural texture and characteristic appearance of the surface or peel of the fruit. An orange, for example, has a characteristically irregular or textured surface, having spaced relatively large oil cells immediately beneath the surface and other intermediate cells at greater depth. The larger oil cells are clearly visible and appear to be slightly darker than the remainder of the peel. After treatment in accordance with this invention, the color of the fruit is enhanced or a characteristic color is imparted thereto but the texture and slightly spotted appearance caused by the presence of oil cells is still evident. Furthermore, the coloration imparted in accordance with this invention is substantially uniform over the entire fruit. In the treatment of oranges having green areas (caused by the presence of green chlorophyll) the fruit may be first subjected to a bleaching action with hydrocarbon gases such as ethylene, and then treated in accordance with this invention with a color-imparting agent consisting of a solvent or material capable of affecting the oily and water-impervious skin, such solvent carrying a desired coloring substance. As stated hereinbefore, the desired color is absorbed by and becomes an inherent part of the peel of the fruit but does not penetrate into the aqueous cellulosic tissues so as to discolor the same.

It is to be understood that the hereinabove described color-imparting process may be used as a separate step in the treatment or conditioning of fruit, or it may become a part of the present packing house practice. In other words, mold-inhibiting agents, waxes or water-soluble dyes may be made a part of the treating solution or emulsion so that the fruit is washed, sterilized, colored and provided with a shrinkage-retarding coating at the same time.

These and other advantages, modifications and adaptations will occur to those skilled in the art, it being understood that all such changes and modifications, uses and adaptations of this invention as come within the scope of the appended claims are embraced thereby.

This application is a continuation in part of application Serial No. 638,780, filed October 20, 1932.

The invention contemplates the treatment of citrus fruit to enhance the natural or varietal color of the fruit. By this is meant impregnating the skin or peel of paler oranges with a coloring material such as dye to give them a deeper orange color corresponding to fuller colored fruit. It is not contemplated that a color will be imparted that would render the appearance of the fruit unnatural.

I claim:

1. A process of enhancing the natural color of the skin or peel of fresh citrus fruits comprising contacting whole citrus fruit with a dye-containing liquid having such penetrant properties for the oily or waxy constituents of the skin or peel of the fruit as to impregnate the latter with said dye to impart a uniform added color thereto.

2. A process of enhancing the natural color of the skin or peel of fresh citrus fruit comprising contacting whole citrus fruit with a carrier miscible with the oily and waxy constituents of the skin or peel of the fruit, said carrier bearing a color material, whereby the skin or peel is caused to absorb color from the carrier.

3. A process of enhancing the varietal color of the skin or peel of fresh citrus fruit consisting in impregnating the skin of the whole fruit with a suitable coloring medium applied to the fruit by an emulsion of water and a solvent for the oily and waxy constituents of the skin.

4. A process of enhancing the varietal color of the skin or peel of fresh citrus fruit consisting in impregnating the skin of the whole fruit with a suitable coloring medium applied to the skin by a liquid containing a solvent for the oily and waxy consitituents of the skin.

5. A process of impregnating the skin or peel of fresh citrus fruit with a dye adapted to enhance the varietal color of the fruit comprising contacting the whole fruit with an emulsion containing the dye, a solvent for the oily and waxy constituents of skin or peel, and a spreader to assist in distributing the emulsion over the surface of the fruit.

Signed at St. Paul, Ramsey County, Minnesota, this 18th day of February, 1933.

RODNEY B. HARVEY.